US011430425B2

(12) United States Patent
Patel et al.

(10) Patent No.: US 11,430,425 B2
(45) Date of Patent: Aug. 30, 2022

(54) SPEECH GENERATION USING CROSSLINGUAL PHONEME MAPPING (71) Applicant: Google LLC, Mountain View, CA (US)

(72) Inventors: Ami Patel, Mountain View, CA (US); Siamak Tazari, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 18 days.

(21) Appl. No.: 16/620,223

(22) PCT Filed: Oct. 11, 2018

(86) PCT No.: PCT/US2018/055423
§ 371 (c)(1),
(2) Date: Dec. 6, 2019

(87) PCT Pub. No.: WO2020/076325
PCT Pub. Date: Apr. 16, 2020

(65) Prior Publication Data
US 2020/0342851 A1 Oct. 29, 2020

(51) Int. Cl.
G10L 13/033 (2013.01)
G10L 13/08 (2013.01)
(Continued)

(52) U.S. Cl.
CPC .............. *G10L 13/086* (2013.01); *G06N 3/04* (2013.01); *G10L 13/047* (2013.01)

(58) Field of Classification Search
CPC ...... G06F 40/58; G06F 16/3329; G06F 40/00; G06F 40/263; G10L 13/00; G10L 13/08; G10L 13/086; G10L 15/005; G10L 15/187
See application file for complete search history.

(56) References Cited

U.S. PATENT DOCUMENTS 6,157,905 A * 12/2000 Powell ................. G06F 40/126
704/2
8,352,268 B2 * 1/2013 Naik ..................... G10L 13/033
704/258
(Continued)

OTHER PUBLICATIONS

Qian et al, "A cross-language state sharing and mapping approach to bilingual (Mandarin-English) TTS", 2009, IEEE Transactions on Audio, Speech, and Language Processing. Jun. 30, 2009;17(6):1231-9.*
(Continued)

*Primary Examiner* — Olujimi A Adesanya
(74) *Attorney, Agent, or Firm* — Middleton Reutlinger (57) ABSTRACT Computer generated speech can be generated for cross-lingual natural language textual data streams by utilizing a universal phoneme set. In a variety of implementations, the natural language textual data stream includes a primary language portion in a primary language and a secondary language portion that is not in the primary language. Phonemes corresponding to the secondary language portion can be determined from a set of phonemes in a universal data set. These phonemes can be mapped back to a set of phonemes for the primary language. Audio data can be generated for these phonemes to pronounce the secondary language portion of the natural language textual data stream utilizing phonemes associated with the primary language.

16 Claims, 7 Drawing Sheets (51) Int. Cl.
*G06N 3/04* (2006.01)
*G10L 13/047* (2013.01)

(56) References Cited

U.S. PATENT DOCUMENTS

| | | | | |
|---|---|---|---|---|
| 8,380,507 | B2* | 2/2013 | Herman | G10L 15/005 704/260 |
| 8,712,776 | B2* | 4/2014 | Bellegarda | G10L 13/08 704/260 |
| 8,831,948 | B2* | 9/2014 | Roberts | G10L 13/04 704/260 |
| 9,483,461 | B2* | 11/2016 | Fleizach | G06F 40/263 |
| 9,922,641 | B1* | 3/2018 | Chun | G10L 15/07 |
| 2005/0144003 | A1* | 6/2005 | Iso-Sipila | G10L 13/08 704/269 |
| 2006/0184357 | A1* | 8/2006 | Ramsey | G06F 40/263 704/9 |
| 2009/0006097 | A1 | 1/2009 | Etezadi et al. | |
| 2009/0055162 | A1 | 2/2009 | Qian et al. | |
| 2009/0248395 | A1 | 10/2009 | Alewine et al. | |
| 2010/0082328 | A1 | 4/2010 | Rogers et al. | |
| 2010/0198577 | A1* | 8/2010 | Chen | G10L 15/187 704/2 |
| 2012/0046948 | A1* | 2/2012 | Leddy | G10L 13/06 704/260 |
| 2012/0046949 | A1* | 2/2012 | Leddy | G10L 13/033 704/260 |
| 2012/0173241 | A1* | 7/2012 | Li | G10L 13/10 704/260 |
| 2012/0253781 | A1* | 10/2012 | Qian | G10L 21/003 704/2 |
| 2014/0222415 | A1 | 8/2014 | Legat | |
| 2015/0186359 | A1* | 7/2015 | Fructuoso | G10L 13/08 704/8 |
| 2017/0309272 | A1 | 10/2017 | Vanreusel et al. | |
| 2018/0268732 | A1* | 9/2018 | Thiel | G09B 5/02 |
| 2018/0268806 | A1 | 9/2018 | Chun et al. | |
| 2020/0082806 | A1* | 3/2020 | Kim | G10L 13/10 |
| 2020/0380952 | A1* | 12/2020 | Zhang | G10L 13/02 |

OTHER PUBLICATIONS

Ramani et al, "A common attribute based unified HTS framework for speech synthesis in Indian languages", 2013,. In Eighth ISCA Workshop on Speech Synthesis 2013, pp. 291-296.*

Moberg et al, "Cross-lingual phoneme mapping for multilingual synthesis systems", 2004, In Eighth International Conference on Spoken Language Processing 2004.pp. 1-4.*

Justin et al, "Towards automatic cross-lingual acoustic modelling applied to HMM-based speech synthesis for under-resourced languages", 2016, Automatika: časopis za automatiku, mjerenje, elektroniku, računarstvo i komunikacije. Sep. 1, 2016;57(1):268-81, pp. 269-281.*

European Patent Office; Examination Report for Application No. 18796268.3 dated Jun. 3, 2020.

Ghoshal et al., "Multilingual Training of Deep Neural Networks in Acoustics, Speech and Signal Processing" (ICASSP), 2013 IEEE International Conference. pp. 7319-7323. 6 pages.

Knill et al., "Investigation of Multilingual Deep Neural Networks for Spoken Term Detection" Department of Engineering, University of Cambridge 2013. 6 pages.

Bisani & Ney, "Joint Sequecne Models for Grapheme-to-Phoneme Conversion" Speech Communication, Elsevier: North-Holland, 2008, 50 (5), pp. 434. 43 pages.

Lu et al., "Regularized Subspace Gaussian Mixture Models for Cross-lingual Speech Recognition" Centre for Speech Technology Research, University of Edinburgh, UK. 6 pages.

Gonzalvo & Podsiadlo, "Text-To-Speech with cross-lingual Nerual Network-based grapheme-to-phoneme models" Interspeech 2014. 5 pages.

Wells, "Computer-coding the IPA: a proposed extension of SAMPA" University College London 1995. 18 pages.

Vasserman et al., "Contextual Language Model Adaptation Using Dynamic Classes" Google Inc. 2016. 6 pages.

Bruguier et al., "Pronunciation Learning with RNN-Transducers" Interspeech, ISCA 2017. 5 pages.

Leonardo et al., "A General Approach to TTS Reading of Mixed-Language Texts" Loquendo S.p.A., Voice Technologies 2004. 4 pages.

Szaszak & Garner, "Evaluating Intra- and Crosslingual Adaptation for Non-native Speech Recognition in a Bilingual Environment" Idiap Research Institute. 4th IEEE International Conference on Cognitive Info communications 2013. 5 pages.

Sim & Li, "Robust Phone Set Mapping Using Decision Tree Clustering For Cross-lingual Phone Recognition" Institute for Infocomm Research 2008. 4 pages.

Nouza & Bohac, "Using TTS for Fast Prototyping of Cross-Lingual ASR Applications" Institute of Information Technology and Electronics, Technical University of Liberec pp. 154-162, 2011. 9 pages.

Campbell, "Foreign-Language Speech Synthesis" ATR Interpreting Telecommunications Research Labs. 4 pages.

European Patent Office; International Search Report and Written Opinion of Ser. No. PCT/US2018/055423, 17 pages, dated May 9, 2019.

European Patent Office; Communication under Rule 71(3)EPC issued in Application No. 18796268.3; 41 pages; dated Jan. 28, 2021.

European Patent Office; Extended European Search Report issued in Application No. 21183937.8, 8 pages, dated Apr. 12, 2022.

* cited by examiner

SPEECH GENERATION USING CROSSLINGUAL PHONEME MAPPING

BACKGROUND

Human language can be divided into units of sound. For example, phonemes are units of sound which can distinguish words from each other. Words in the English language can be divided into 44 phonemes, where each phoneme is a different sound a person can make when saying a word. In contrast, words in the Spanish language can be pronounced using 24 phonemes. Computing systems can generate artificial human speech based on textual input. For example, a text-to-speech ("TTS") system can generate artificial human speech from a natural language textual input. For instance, a TTS system can, given a textual input, convert the written input into computer generated speech. Some TTS systems can convert textual input into a sequence of phonemes, and generate audio output based on the sequence of phonemes, where the audio output can be audibly rendered as computer generated speech that reflects the sequence of phonemes.

SUMMARY

Implementations described herein convert natural language text into computer generated speech by at least selectively using a universal phoneme set in mapping phonemes (for the natural language text), for a portion of the natural language text that is in a secondary language that is unfamiliar to a user, to phonemes for a primary language that is familiar to the user. As one example, assume that text, that is to be converted into speech for rendering to a user, includes secondary term(s) that are in a secondary language that is not familiar to the user (e.g., not assigned as an understood language for an account associated with the user). In various implementations described herein, phonemes, for the secondary terms, can be determined and can include one or more universal phonemes. In those various implementations, such universal phoneme(s) for the secondary term(s) can be mapped, using mappings defined between phonemes in the universal phoneme set and a phoneme set associated with the primary language, to correlated phoneme(s) for the primary language assigned to the user. The mapping of the universal phoneme(s) for the secondary term(s) to the correlated phoneme(s) can be responsive to determining that the secondary language is not a language that is familiar to the user. Thereafter, speech can be generated using the correlated phonemes, in lieu of the universal phonemes, and the generated speech can be rendered to the user via one or more hardware speakers. Thus, the generated and rendered speech will convey the secondary terms using the correlated phoneme(s) that are familiar to the user, in lieu of phonemes that are unfamiliar to the user. This makes the rendered speech easier to comprehend for the user as it utilizes phonemes that are familiar to the user in place of phonemes that are unfamiliar to the user. This improved comprehension provides for improved human-system interaction in performance of various system-guided technical tasks, in which the system generates speech output in guiding the user in performance of the tasks. Further, the improved comprehension mitigates the likelihood the user will request the rendered speech to be repeated, thereby conserving client device resources that would otherwise be utilized in again rendering the speech.

Further, various implementations disclosed herein at least selectively determine that universal phonemes of secondary term(s) (in a secondary language) of a cross-lingual utterance, should not be mapped to correlated phoneme(s) in a primary language—and, instead, the universal phonemes should be utilized in generating the speech. This can occur, for example, responsive to determining that the secondary language is a language that is familiar to the user. Accordingly, in those implementations, the generated and rendered speech will convey the secondary term(s) using phoneme(s) for the secondary language, but not phoneme(s) for the primary language. Given the user's familiarity with the secondary language, the rendered speech can be easier, for that user, to comprehend as the speech that conveys the secondary term(s) utilizes phonemes that cause the secondary term to be audibly conveyed in a manner as if it were spoken by a native speaker of the secondary language—and that manner can be what the user expects and more readily comprehends. This improved comprehension can likewise provide for improved human-system interaction in performance of various system-guided technical tasks and/or mitigate the likelihood the user will request the rendered speech to be repeated.

As one example, assume that text, that is to be converted into speech for rendering to a user, includes secondary term(s) that are in a secondary language that is familiar to the user (e.g., assigned as an understood language for an account associated with the user). In various implementations described herein, phonemes, for the secondary terms, can be determined and can include one or more universal phonemes. In those various implementations, such universal phoneme(s) for the secondary term(s) can be used in generating speech, instead of replacing those phonemes with correlated phoneme(s) in a primary language assigned to the user. The use of universal phoneme(s) in place of mapping to primary phoneme(s) can be responsive to determining that the secondary language is a language that is familiar to the user. Thereafter, speech can be generated using the universal phonemes, and the generated speech rendered to the user via one or more hardware speakers. Thus, the generated and rendered speech will convey the secondary terms to be audibly conveyed as if a native speaker of the secondary language were speaking them.

A universal phoneme set in accordance with various implementations includes sounds common among many languages (i.e., universal sounds). In a variety of implementations a universal phoneme set contains around 100 distinct phonemes. Text to speech ("TTS") systems in accordance with a variety of implementations can convert text (such as a natural language data stream), or phonemes for the text, into computer generated speech. Cross-lingual natural language data streams are data streams that include text in multiple disparate languages. For example, a cross-lingual natural language data stream can include portion(s) in a primary language and portion(s) in a unique secondary language (e.g., a phrase in the primary language with one or more words in a secondary language). For instance, "take a right on Ingolstädter Straße" includes a portion in English ("take a right on") and a portion in German ("Ingolstädter Straße"). In various implementations, TTS systems can determine a natural language data stream is cross-lingual by the absence of one or more words in the data stream in a primary language lexicon. Additionally or alternatively, a TTS system can receive a signal indicating a data stream is cross-lingual (e.g., a map application can provide a signal indicating it is providing directions in a country different from a designated home country for a client device running the map application). In many implementations, a primary language lexicon can include a set of phonemes corresponding with the pronunciation of a word in the primary language. Similarly, a universal language lexicon can include a set of phonemes from the universal phoneme set corresponding with the pronunciation of a word. In many implementations, the word(s) in the secondary language can be found in the universal language lexicon, and the set of universal phonemes used to pronounce the word can be mapped back to phonemes in the primary language, thus generating a pronunciation of the second language word(s) in the primary language.

Additionally or alternatively, phonemes from the universal phoneme set can be generated for words not present in the universal language lexicon. In some such implementations, phonemes can be generated on the fly using a grapheme to phoneme model and/or additional model(s) to predict universal phonemes corresponding with the word in the secondary language. Similarly, phonemes generated on the fly can be mapped to phonemes in the primary language.

Phonemes can be used by the TTS system to generate audio data for rendering the input text via a speaker. In many implementations, audio data can generate a multilingual voice where the voice can pronounce a variety of languages using phonemes associated with that language. In other words, the same voice can pronounce words in English using English phonemes, words in German using German phonemes, words in French using French phonemes, and/or other language and corresponding phoneme combinations. TTS systems in accordance with many implementations described herein can provide a better understanding of cross-lingual text to multilingual users. Portions of a data stream in a secondary language can be pronounced in that language which can provide a clearer understanding of the portion of the data stream to a user who speaks the secondary language. For example, a German street name pronounced with German phonemes as part of directions to that street provided in English can be more easily understood by a German/English speaker than the German street name pronounced with an English accent. In some such implementations, computational efficiencies can be obtained by the TTS system by reducing the need for the multilingual user to replay unclear information, request additional information, etc. Furthermore, use of a universal phoneme set can provide storage efficiencies by eliminating the need to store a phoneme mapping between every language pair on a computing device. Additionally or alternatively, a set of phonemes corresponding with a word in an unknown secondary language can be generated faster by looking up the word(s) in a universal language lexicon instead of many language specific lexicons.

The above description is provided as an overview of various implementations disclosed herein. Those various implementations, as well as additional implementations, a described in more detail here.

In some implementations, a method for generating computer generated speech from a natural language textual data stream is provided that includes receiving a natural language textual data stream to be converted into computer generated speech for rendering to a user via one or more speakers of a computing device, where the natural language textual data stream includes a primary portion that is in a primary language assigned to the user, and a secondary language portion that is not in the primary language assigned to the user. The method further includes determining whether the secondary language portion of the natural language textual data stream is in a secondary language that is not assigned as a familiar language for the user. The method further includes processing the primary portion of the natural language textual data stream to determine a first set of phonemes that are assigned to the primary language and that correspond to the primary portion. The method further includes processing the secondary portion of the natural language textual data stream to determine a second set of phonemes in a universal phoneme set that corresponds to the secondary portion, where the universal phoneme set includes at least phonemes corresponding to the primary language and the secondary language. The method further includes, in response to determining that the secondary language portion is in the secondary language that is not assigned as a familiar language for the user: mapping the one or more second phonemes, that correspond to the secondary portion and that are not for the primary language, to one or more correlated phonemes in the primary language, where mapping the one or more second phonemes to the one or more correlated phonemes is based on defined mappings between phonemes in the universal phoneme set to primary language phonemes. The method further includes generating a modified second set of phonemes by replacing the one or more second phonemes, in the second set of phonemes, with the correlated phonemes in the primary language. The method further includes processing the first set of phonemes and the modified second set of phonemes to generate audio data that mimics a human speaker speaking the first set of phonemes and the modified second set of phonemes. The method further includes causing the audio data to be rendered via the one or more speakers of the computing device. These and other implementations of the technology disclosed herein can include one or more of the following features.

In some implementations, in response to determining that the secondary language portion is not in the secondary language that is not assigned as a familiar language for the user and instead is in an additional secondary language that is assigned as a familiar language for the user: the method further includes processing the first set of phonemes and the second set of phonemes without mapping the second set of phonemes to phonemes in the primary language. In some implementations, the method further includes causing the alternate audio data to be rendered via the one or more speakers of the computing device. In some versions of those implementations, the method further includes the additional secondary language is assigned as a familiar language for the user based on data provided by the computing device or based on data stored in association with an account assigned to the user. In some versions of those implementations, the method further includes processing the first set of phonemes and the second set of phonemes to generate the alternate audio data comprises processing the first set of phonemes and the second set of phonemes using a trained neural network model trained at least in part based on audio data from a human speaker that is fluent in the primary language and is fluent in the additional secondary language.

In some implementations, a remote computing system provides the natural language textual data stream and provides, with the natural language textual data stream, an indication that the secondary language portion is not in the primary language.

In some implementations, the method further includes determining that the secondary language portion of the natural language textual data stream is not in the primary language, where determining that the secondary language portion is not in the primary language comprises: determining that one or more secondary words in the natural language textual data stream are not in a primary language lexicon for with the primary language. In some versions of those implementations, the method further includes processing the secondary portion of the natural language textual data stream to determine the second set of phonemes in the universal phoneme set that correspond to the secondary portion comprises: determining that the one or more second words that are not in the primary language lexicon for the primary language, are in an alternate lexicon. The method further includes retrieving the second set of phonemes for the secondary language portion in the alternate lexicon. In some versions of those implementations, the method further includes processing the secondary portion of the natural language textual data stream to determine the second set of phonemes in the universal phoneme set that correspond to the secondary portion by automatically determining the second set of phonemes using a grapheme to phoneme model.

In some implementations, the method further includes processing the first set of phonemes and the modified second set of phonemes to generate audio data that mimics a human speaker speaking the first set of phonemes and the modified second set of phonemes comprises processing the first set of phonemes and the second set of phonemes using a neural network model trained to generate human speech using phonemes that are specific to each of multiple languages. In some versions of those implementations, the method further includes training the neural network model based on a plurality of training instances that each includes a corresponding cross-lingual spoken utterance from a multilingual user and corresponding cross-lingual phonemes corresponding to the cross-lingual spoken utterance.

In some implementations, a method for generating computer generated speech from a natural language textual data stream is provided and includes: receiving, at a computing system remote from a client device, a natural language textual data stream to be converted into computer generated speech for rendering to a user via one or more speakers of the client device, where the natural language textual data stream includes a primary portion that is in a primary language assigned to the user, and a secondary language portion that is not in the primary language assigned to the user. The method further includes determining whether the secondary language portion of the natural language textual data stream is in a secondary language that is not assigned as a familiar language for the user. The method further includes processing the primary portion of the natural language textual data stream to determine a first set of phonemes that are assigned to the primary language and that correspond to the primary portion. The method further includes processing the secondary portion of the natural language textual data stream to determine a second set of phonemes in a universal phoneme set that correspond to the secondary portion, wherein the universal phoneme set includes at least phonemes corresponding to the primary language and the secondary language. The method further includes, in response to determining that the secondary language portion is in the secondary language that is not assigned as a familiar language for the user: mapping the one or more second phonemes, that correspond to the secondary portion and that are not for the primary language, to one or more correlated phonemes in the primary language, where mapping the one or more second phonemes to the one or more correlated phonemes is based on defined mappings between phonemes in the universal phoneme set to primary language phonemes. The method further includes generating a modified second set of phonemes by replacing the one or more second phonemes, in the second set of phonemes, with the correlated phonemes in the primary language. The method further includes processing the first set of phonemes and the modified second set of phonemes to generate audio data that mimics a human speaker speaking the first set of phonemes and the modified second set of phonemes.

These and other implementations of the technology disclosed herein can include one or more of the following features.

In some implementations, the natural language textual data stream is generated by the computing system remote from the client device. In some versions of those implementations, the natural language textual data stream is transmitted by the remote client device to the computing system via a network.

In some implementations, TTS systems for generating computer generated speech for cross-lingual natural language data streams can generate phonemes using additional and/or alternative techniques in addition to a universal phoneme set. Determining a user is familiar with a primary language and a secondary language (i.e., a user is multilingual) can utilize one of these additional and/or alternative phoneme generation techniques when a TTS system is processing a natural language data stream without the use of a universal phoneme set.

In some implementations, systems comprising one or more processors and memory operably coupled with the one or more processors, where the memory stores instructions that, in response to execution of the instructions by one or more processors, cause the one or more processors to perform any one of the preceding methods.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
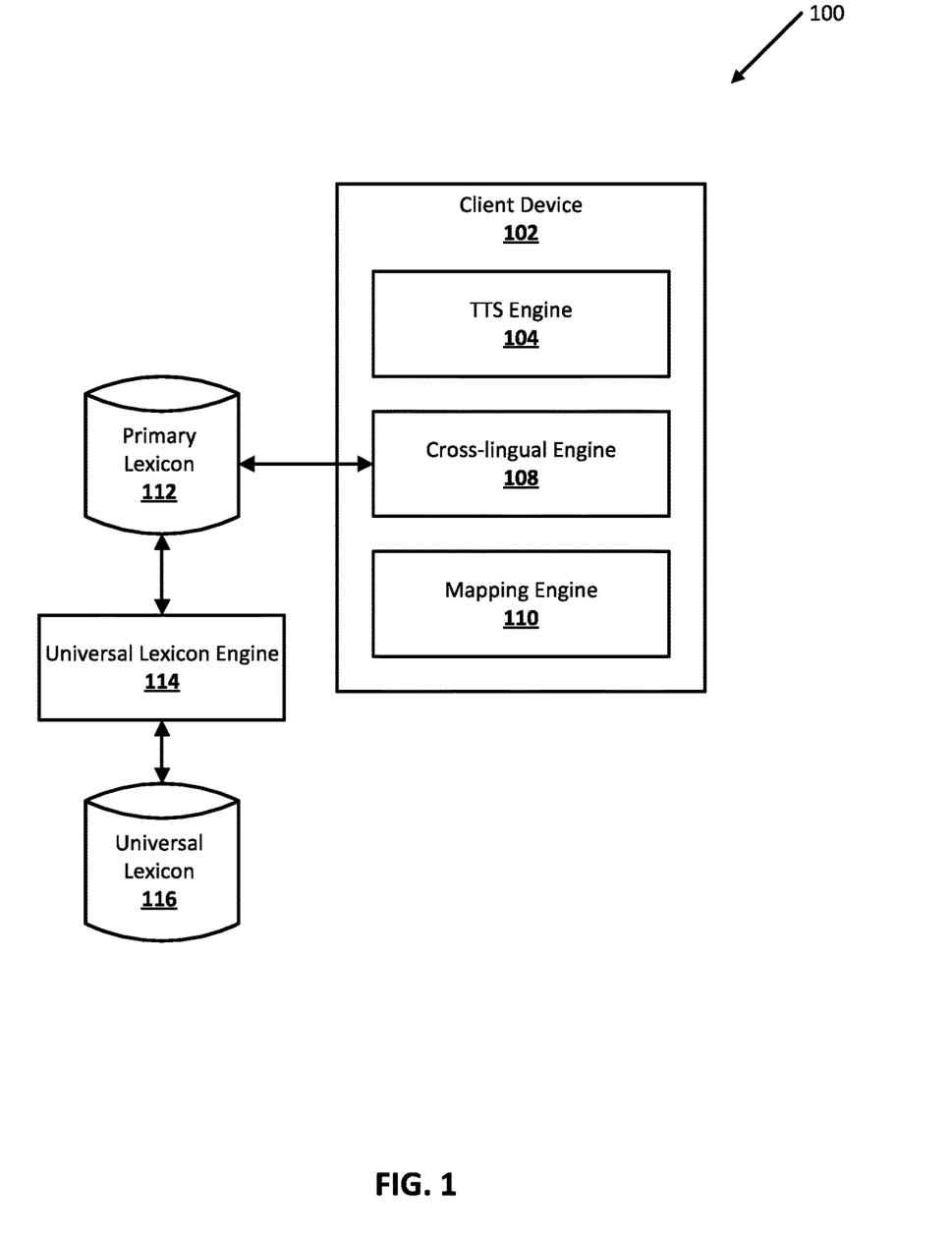
FIG. 1 is a block diagram of an example environment in which implementations disclosed herein may be implemented.

FIG. 1 illustrates an example environment in which implementations disclosed herein may be implemented. The example environment 100 in FIG. 1 includes client device 102, text to speech ("TTS") engine 104, cross-lingual engine 108, mapping engine 110, and universal lexicon engine 114. The client device 102 may be, for example, a standalone voice-activated speaker device, a desktop computing device, a laptop computing device, a tablet computing device a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch having a computing device, glasses having a computing device, a virtual or augmented reality computing device, etc.). Additional and/or alternative client devices may be provided.

TTS engine 104, cross-lingual engine 108, mapping engine 110, and universal lexicon engine 114 are example components in which techniques described herein may be implemented and/or with which systems, components, and techniques described herein may interface. The operations performed by one or more engines 104, 108, 110, 114 of FIG. 1 may be distributed across multiple computing systems. In some implementations, one or more aspects of engines 104, 108, 110, 114 may be combined in a single system and/or one or more aspects may be implemented on the client device 102. For example, in some of those implementations, aspects of cross-lingual engine 108 may be combined with aspects of mapping engine 110. Engines in accordance with many implementations may each be implemented in one or more computing devices that communicate, for example, through a communication network. A communication network may include a wide area network such as the internet, one or more local area networks such as Wi-Fi local area networks, mesh networks, etc., and/or one or more bus subsystems. A communication network may optionally utilize one or more standard communication technologies, protocols, and/or inter-process communication techniques.

In many implementations, a client device 102 can include TTS engine 104 which can covert text to computer generated speech. In some such implementations, TTS engine 104 can receive natural language text input from another engine within client device 102 (not illustrated) and/or a remote computing system. In other implementations, TTS engine 104 can generate natural language text input. Additionally or alternatively, TTS engine 104 can generate audio data that mimics a human speaker speaking one or more phonemes. In many implementations, audio data can be rendered via one or more speakers (not illustrated) of client device 102 using a multilingual voice where the voice can pronounce a variety of phonemes associated with several languages.

In a variety of implementations, cross-lingual engine 108 can determine if a natural language data stream is cross-lingual (i.e., the natural language data stream contains portion(s) in a primary language as well as portion(s) in a secondary language). In some such implementations, an indication can be provided with the natural language data stream that the data stream is cross-lingual. For example, a third party application can provide the natural language data stream and an indication the natural language data stream is cross-lingual to the client device. Additionally or alternatively, cross-lingual engine 108 can process the natural language data stream to determine if it is cross-lingual. In some such implementations, cross-lingual engine 108 can compare word(s) in the natural language data stream with a primary lexicon 112, where the primary lexicon contains words and corresponding phonemes in the primary language. The absence of one or more words in the primary lexicon 112 can indicate those words are not in the primary language. In many implementations, universal lexicon engine 112 can receive an indication a word is not an entry in primary lexicon 112 and can similarly search for the word in universal lexicon 116. Universal lexicon 116 can include words in many languages and corresponding phonemes for those words from a universal phoneme set. If a word is not in primary lexicon 112 or universal lexicon 116, cross-lingual engine 108 can generate phonemes from a universal phoneme set for the word. In many implementations, a grapheme to phoneme language model and/or other language model(s) can be used to (automatically) generate phonemes in the universal phoneme set.

Mapping engine 110 can map a set of phonemes in a universal phoneme set (e.g., phonemes corresponding to a portion of the natural language data stream in the secondary language determined by cross-lingual engine 108) to phonemes in a primary language. In some implementations, mapping engine 110 can utilize acoustic coupling to map from a universal phoneme set to corresponding phonemes in a primary language.

Figure 2A:
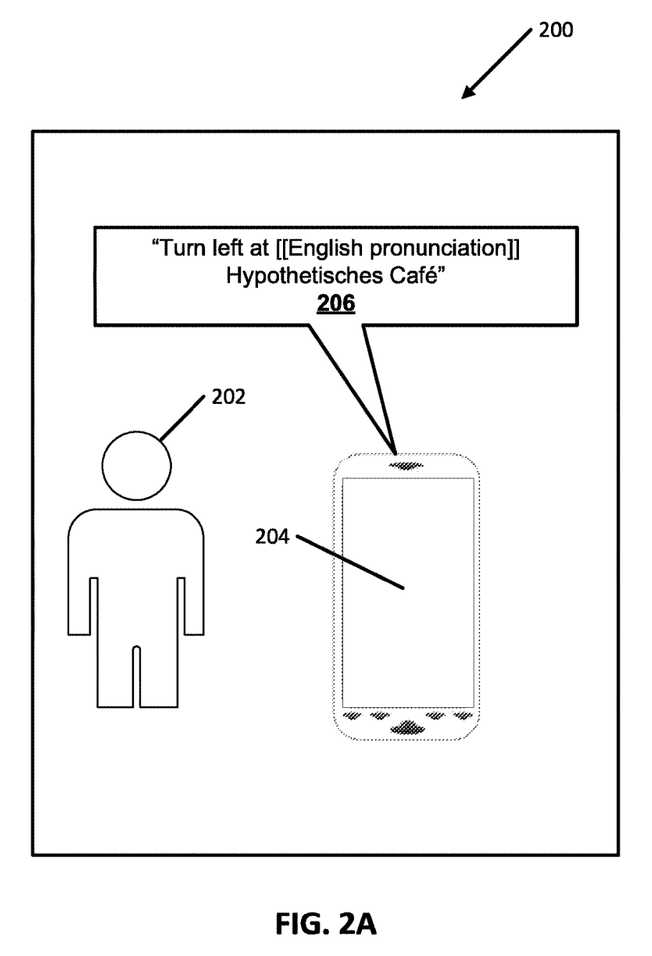
FIG. 2A is a scene illustrating an example of a user interacting with a text to speech system according to implementations disclosed herein.
Figure 2B:
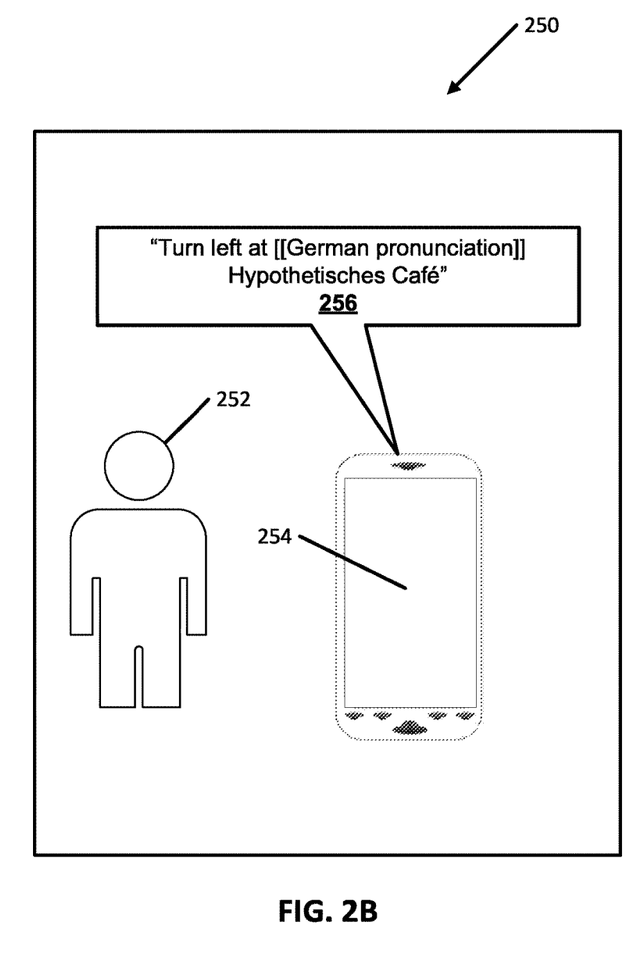
FIG. 2B is a scene illustrating an additional example of a user interacting with a text to speech system according to implementations disclosed herein.

FIGS. 2A and 2B illustrate examples of a user interacting with a text to speech system according to implementations disclosed herein. Scene 200 of FIG. 2A includes a user 202 and a client device 204. User 202 is an English speaker unfamiliar with German and is listening to directions from a map application providing directions which include a German location (i.e., Hypothetisches Café) rendered via client device 204. Since the user 202 is not familiar with German, a TTS system in accordance with many implementations can generate audio data where Hypothetisches Café is pronounced with English phonemes. For example, client device 204 can render message 206: "Turn left at [[English pronunciation]] Hypothetisches Café". Scene 250 of FIG. 2B includes user 252 and client device 254. Client device 254 is similarly rendering audio data from a map application providing directions which include a German location. In contrast to user 202 who is not familiar with German, user 252 is familiar with both English and German. In some such implementations, client device 254 can provide an indication that user 252 is familiar with both English and German to TTS systems. Client device 254 can render message 256 "Turn left at [[German pronunciation]] Hypothetisches Café" using a combination of English phonemes and German phonemes (i.e., the German language location can be rendered in German phonemes while the English language directions can be rendered in English phonemes).

Additionally or alternatively, a user can interact with a text to speech system of a client device rendering additional types of audio data. For example, a text to speech system can render instructions for initializing a foreign router, where the majority of the instructions are in the user's primary language but the brand name of the router mentioned in the instructions is a foreign word in a secondary language. As a further example, a multilingual user can initialize the name of a smart light in a secondary language. Text to speech system in accordance with implementations described herein can render computer generated speech including the name of the smart light in the secondary language as part of a statement telling the status of the smart light in the primary language. Additionally or alternatively, the same smart light named in a secondary language can be rendered using phonemes in the primary language when the text to speech system detects a user who is not familiar with the secondary language is requesting status information about the smart light.

Figure 3:
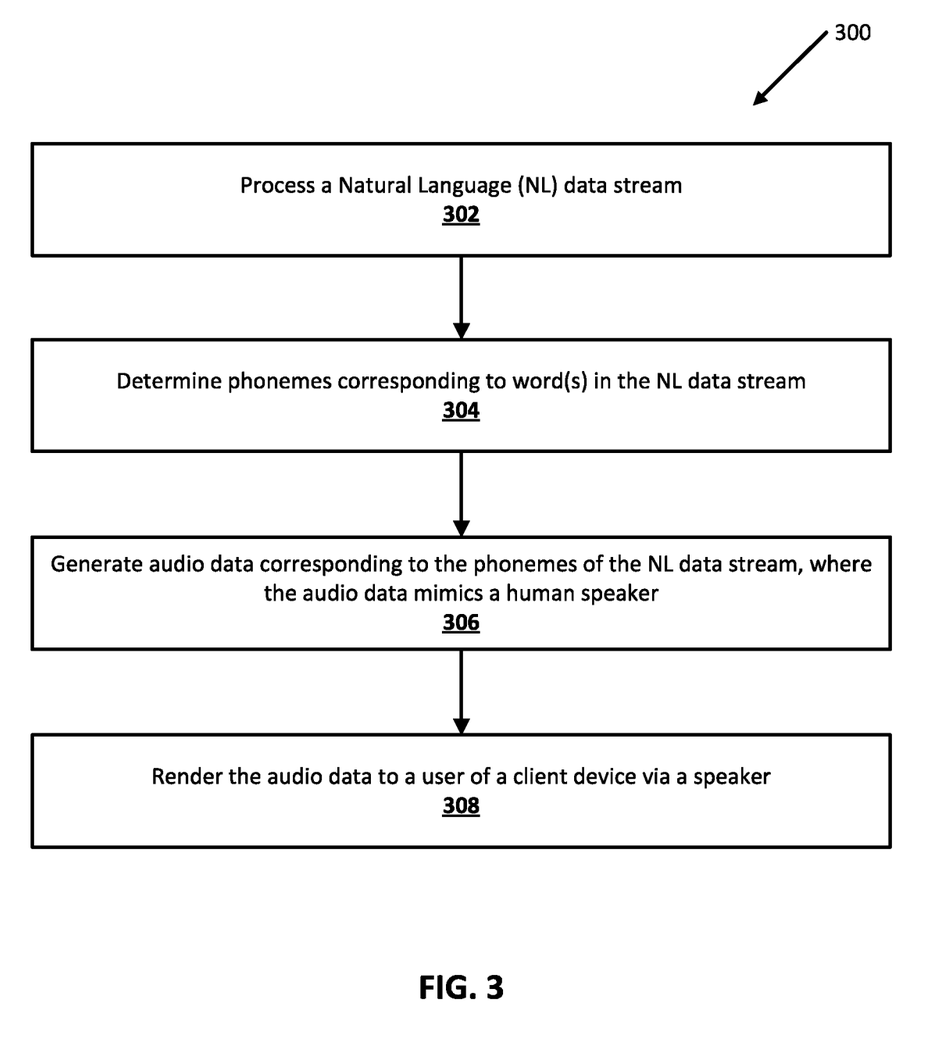
FIG. 3 is a flowchart illustrating a process in accordance with implementations disclosed herein.

FIG. 3 is a flowchart illustrating an example process 300 of rendering computer generated speech based on a natural language data stream according to various implementations disclosed herein. For convenience, the operations of FIG. 3 are described with reference to a system that performs the operations. This system may include various components of various computer systems, such as one or more components of client device 102. Moreover, while operations of process 300 are shown in a particular order, this is not meant to be limiting. One or more operations may be reordered, omitted, and/or added.

At block 302, the system processes a natural language textual data stream. In many implementations, the natural language data stream can be received by a client device from a remote computing system such as a server, a third party application, and/or additional remote computing system(s). Additionally or alternatively, a client device can generate the natural language data stream. In some implementations, processing a natural language data stream can include a variety of processing to enable a TTS system to render audio data for a cross-lingual data stream, such as performing transliteration on the natural language data stream. For example, a secondary portion of a natural language data stream in Russian can be transposed from Russian characters into Thai characters for use in a Thai TTS system (typically without translating the Russian word(s) into Thai).

At block 304, the system determines phonemes corresponding to word(s) in the natural language data stream. TTS systems in accordance with many implementations can determine if a natural language data stream is cross lingual and/or determine if a user is familiar with more than the primary language (i.e., a multilingual user). In a variety of implementations, phonemes for word(s) in a secondary language can be determined using a universal phoneme set and those phonemes can be mapped back to one or more phonemes in a primary language. A process for determining phonemes for a cross-lingual natural language data stream utilizing a universal phoneme set is described herein including process 400 of FIG. 4.

At block 306, the system generates audio data corresponding to phonemes of the natural language data stream, where the audio data mimics a human speaker. In many implementations, the computer generated audio data can use the same voice for words in the primary language and the secondary language. In some such implementations, a machine learning model (e.g., neural network model) utilized in generating multilingual voice can be trained using a variety of machine learning techniques, where training input for the machine learning technique includes training instances that each include a corresponding cross-lingual utterance spoken form a multilingual user and corresponding cross-lingual phonemes corresponding to the cross-lingual spoken utterance. The machine learning model utilized in generating the multilingual voice can be trained for rendering phonemes in the same group of languages represented in the universal phoneme set.

At block 308, the system renders the audio data to a user of a client device via a speaker, such as client device 102 illustrated in FIG. 1.

Figure 4:
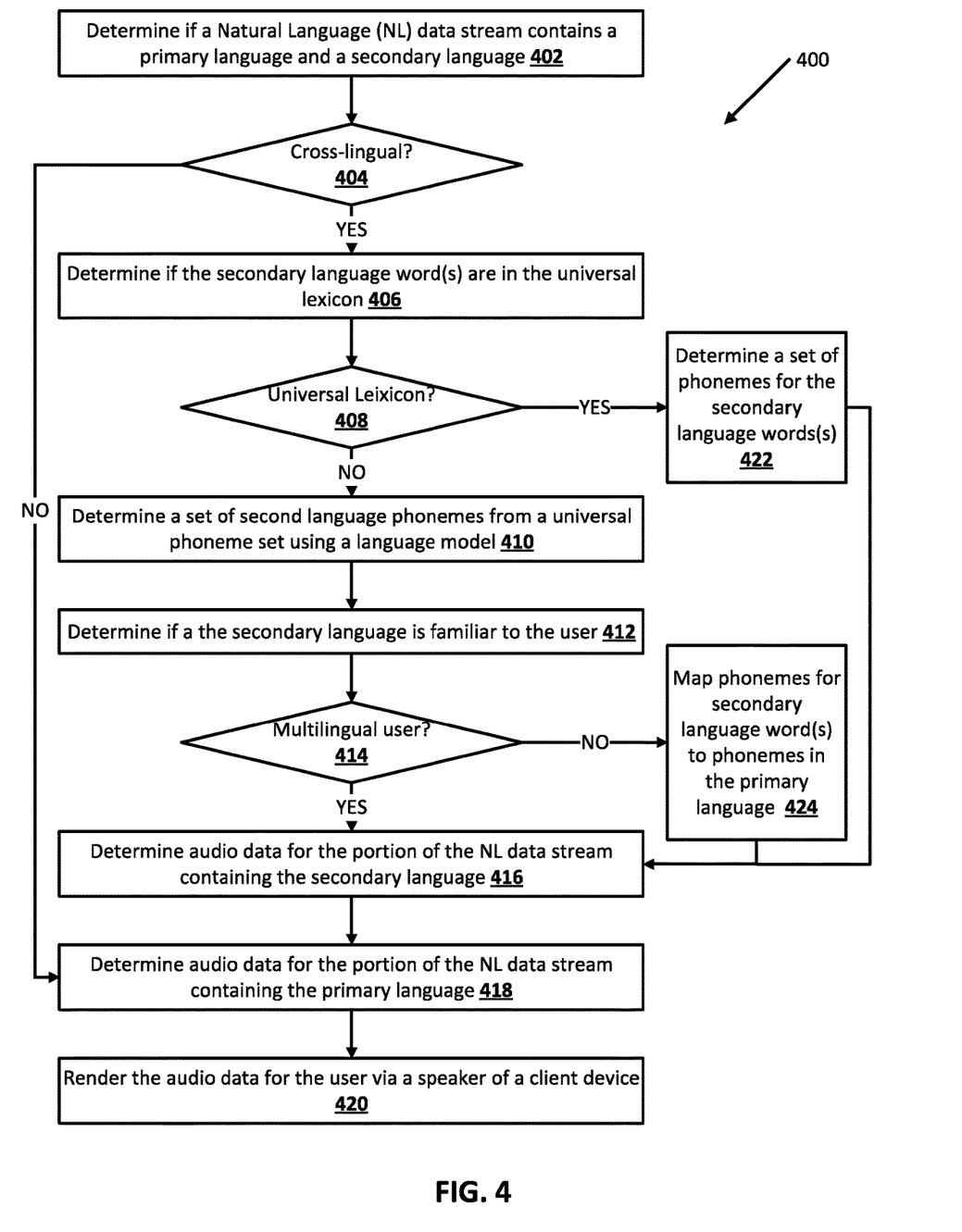
FIG. 4 is a flowchart illustrating another process in accordance with implementations disclosed herein.

FIG. 4 is a flowchart illustrating an example process 400 of generating a set of phonemes according to various implementations disclosed herein. For convenience, the operations of FIG. 4 are described with reference to a system that performs the operations. This system may include various components of various computer systems, such as one or more components of client device 102. Moreover, while operations of process 400 are shown in a particular order, this is not meant to be limiting. One or more operations may be reordered, omitted, and/or added.

At block 402, the system determines if a natural language textual data stream contains a primary language and a secondary language (i.e., the natural language data stream is cross lingual). As described herein, a TTS system in accordance with various implementations can receive an indication a natural language data stream is cross lingual and/or determine one or more words in the natural language data stream are not in a primary language lexicon associated with the primary language. If the system determines the natural language data stream is cross-lingual at block 404, the system proceeds to block 406. Additionally or alternatively, if the system determines at block 404 the natural language data stream is not cross-lingual, the system can proceed to determining audio data for the portion of the natural language data stream containing the primary language at block 418.

At block 406, the system determines if the secondary language portion of the natural language data stream is located in the universal language lexicon. If the secondary language word(s) are present in the universal language lexicon at block 408, the system can determine the set of phonemes from the universal phoneme set for the secondary language word(s) by using the phonemes corresponding with the secondary language word(s) in the universal language lexicon at block 422 before proceeding to block 416, 418, and 420. Additionally or alternatively, the system can determine the secondary language portion of the natural language data stream is not present in the universal lexicon at block 408, and can proceed to block 410.

At block 410, the system determines the set of second language phonemes from the universal phoneme set. As described herein, a language model such as a grapheme to phoneme model can be utilized to generate phonemes for the second language portion of the natural language data stream in the universal phoneme set.

At block 412, the system determines if the secondary language is familiar to the user (i.e., a multilingual user). In a variety of implementations, familiarity with a secondary language and/or multiple additional languages can be provided by the client device and/or based on data stored in association with an account assigned to the user. If the system determines the user is not multilingual at block 414, the system can map phonemes for the secondary language portion to phonemes in the primary language at block 424 before proceeding to blocks 416, 418, and 420. Additionally or alternatively, if the system determines the user is multi-lingual at block 414, the system can proceed to block 416.

At block 416, the system determines audio data for the portion of the natural language data stream containing the secondary language. At block 418, the system determines audio data for the portion of the natural language data stream containing the primary language. At block 420, the system renders the audio data for the user via a speaker of a client device.

Figure 5:
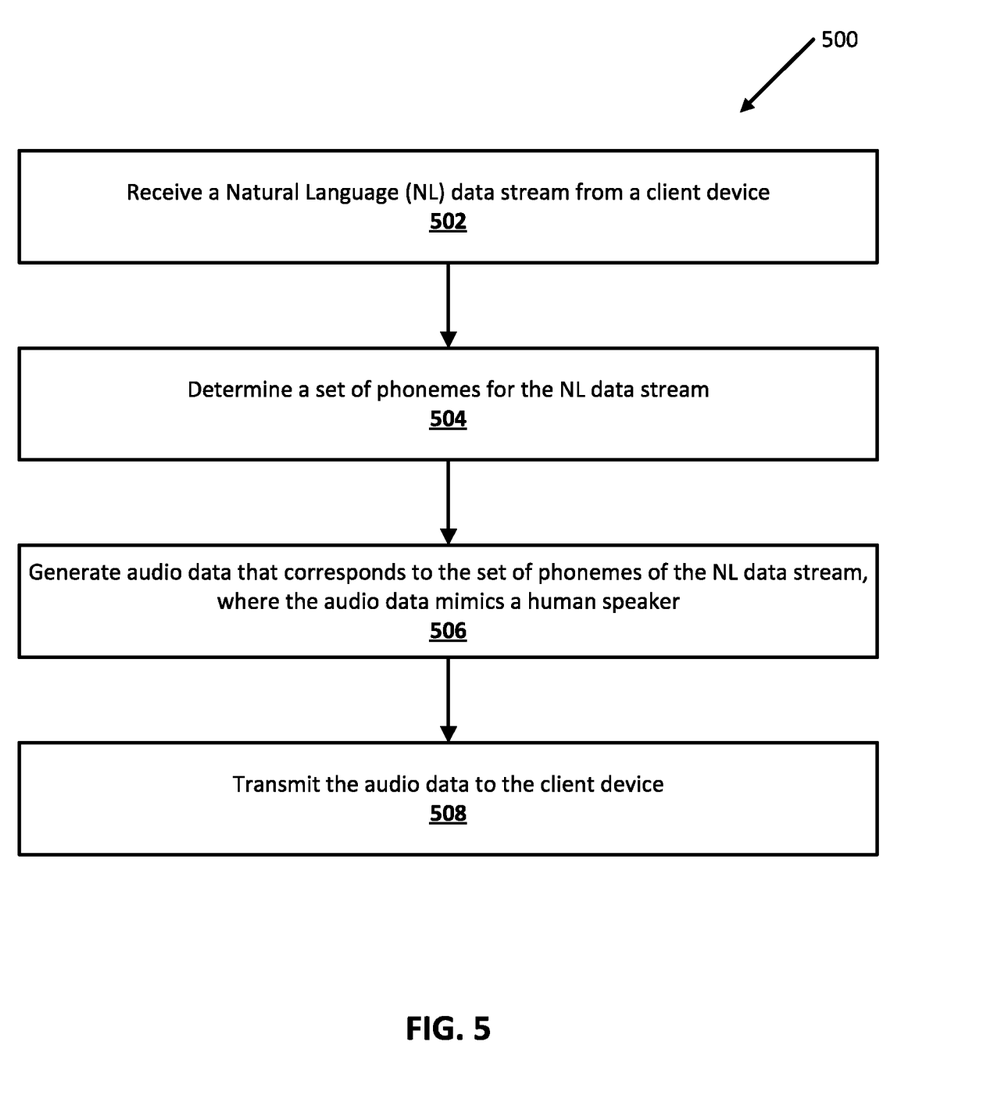
FIG. 5 is a flowchart illustrating another process in accordance with implementations disclosed herein.

FIG. 5 is a flowchart illustrating an example process 500 of generating audio data corresponding to a textual natural language data stream using a remote computing according to various implementations disclosed herein. For convenience, the operations of FIG. 5 are described with reference to a system that performs the operations. This system may include various components of various computer systems, such as one or more components of client device 102. Moreover, while operations of process 500 are shown in a particular order, this is not meant to be limiting. One or more operations may be reordered, omitted, and/or added.

At block 502, the system receives a natural language textual data stream from a remote client device such as client device 102 via a network. In other implementations, the system can generate the textual natural language data stream in response to a request for information provided by the remote client device.

At block 502, the system determines a set of phonemes for the natural language data stream. In a variety of implementations, the natural language data stream can be cross-lingual and implementations described herein including in process 400 of FIG. 4 can be utilized to determine the set of phonemes.

At block 504, the system generates audio data that corresponds to the set of phonemes of the natural language data stream, where the audio data mimics a human speaker.

At block 506, the system transmits the audio data to the remote client device via a network. In some implementations, the client device can render the audio data via a speaker for the user. In other implementations, the system transmits the set of phonemes for the natural language data stream to the client device, and the client device can generate audio data corresponding to the set of phonemes and render the audio data to the user via a speaker.

Figure 6:
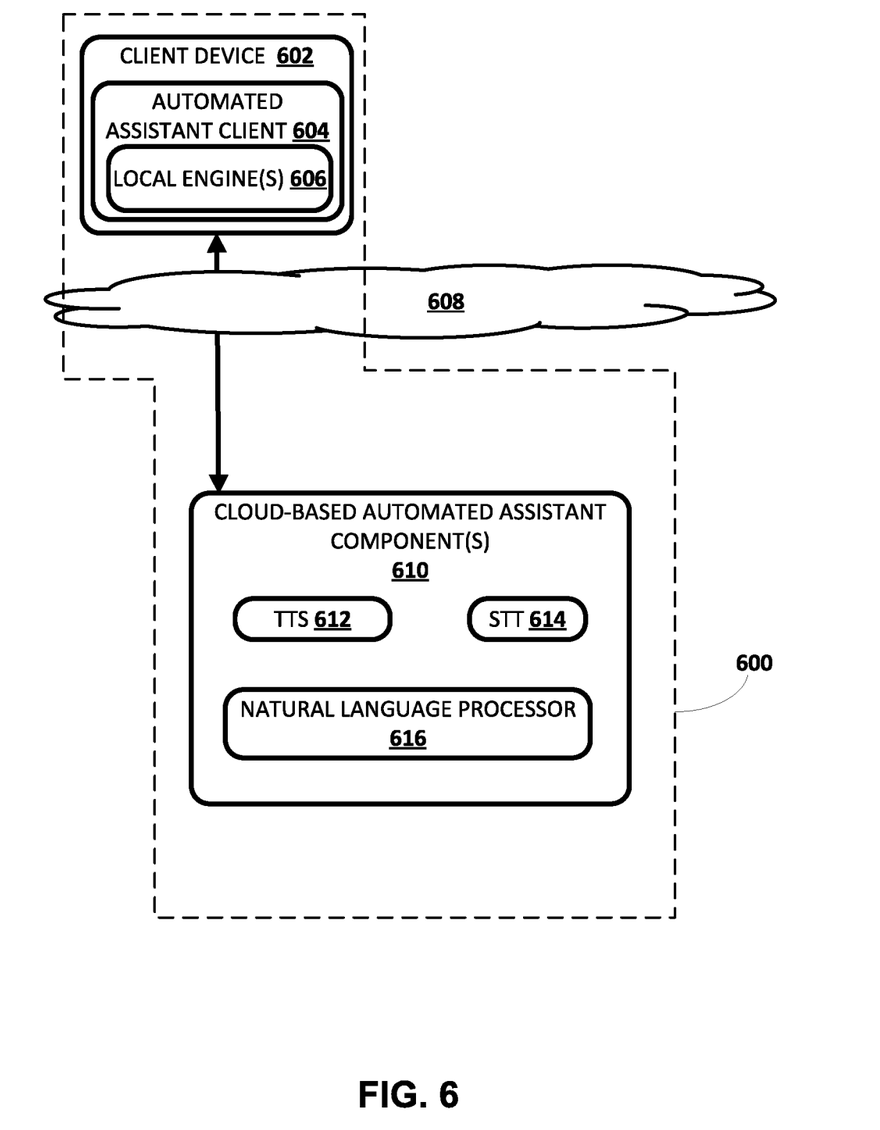
FIG. 6 is an additional block diagram of an example environment in which implementations disclosed herein may be implemented.

Turning now to FIG. 6, an additional example environment is illustrated where various implementations can be performed. FIG. 6 includes a client device 602, which executes an instance of an automated assistant client 604. One or more cloud-based automated assistant components 610 can be implemented on one or more computing systems (i.e., a cloud computing system) that are communicatively coupled to client device 602 via one or more local and/or wide area networks (e.g., the Internet) indicated generally as 608.

An instance of automated assistant client 604, by way of its interactions with one or more cloud-based automated assistant components 610, may form what appears to be, from the user's perspective, a logical instance of an automated assistant 600 with which the user may engage in a human-to-computer dialog. An instance of such an automated assistant 600 is depicted in FIG. 6. It thus should be understood that in some implementations, a user that engages with an automated assistant client 604 executing on client device 602 may, in effect, engage with his or her own logical instance of an automated assistant 600. For the sake of brevity and simplicity, the term "automated assistant" as used herein as "serving" a particular user will often refer to the combination of an automated assistant client 604 executing on a client device 602 operated by the user and one or more cloud-based automated assistant components 610 (which may be shared amongst multiple automated assistant clients of multiple client computing devices). It should also be understood that in some implementations, automated assistant 600 may respond to a request from any user regardless of whether the user is actually "served" by that particular instance of automated assistant 600.

The client computing device 602 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 602 may optionally operate one or more other applications that are in addition to automated assistant client 604, such as a message exchange client (e.g., SMS, MMS, online chat), a browser, and so forth. In some of those various implementations, one or more of the other applications can optionally interface (e.g., via an application programming interface) with the automated assistant 600, or include their own instance of an automated assistant application (that may also interface with the cloud-based automated assistant component(s) 610).

Automated assistant 600 engages in human-to-computer dialog sessions with a user via user interface input and output devices of the client device 602. To preserve user privacy and/or to conserve resources, in many situations a user must often explicitly invoke the automated assistant 600 before the automated assistant will fully process a spoken utterance. The explicit invocation of the automated assistant 600 can occur in response to certain user interface input received at the client device 602. For example, user interface inputs that can invoke the automated assistant 600 via the client device 602 can optionally include actuations of a hardware and/or virtual button of the client device 602. Moreover, the automated assistant client can include one or more local engines 606, such as an invocation engine that is operable to detect the presence of one or more spoken invocation phrases. The invocation engine can invoke the automated assistant 600 in response to detection of one of the spoken invocation phrases. For example, the invocation engine can invoke the automated assistant 600 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 600. As used herein, "invoking" the automated assistant 600 can include causing one or more previously inactive functions of the automated assistant 600 to be activated. For example, invoking the automated assistant 600 can include causing one or more local engines 606 and/or cloud-based automated assistant components 610 to further process audio data frames based on which the invocation phrase was detected, and/or one or more following audio data frames (whereas prior to invoking no further processing of audio data frames was occurring).

The one or more local engine(s) 606 of automated assistant 600 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. A TTS engine in accordance with many implementations disclosed herein can be utilized client device 602 as a local TTS engine. Because the client device 602 is relatively constrained in terms of computing resources (e.g., processor cycles, memory, battery, etc.), the local engines 606 may have limited functionality relative to any counterparts that are included in cloud-based automated assistant components 610.

Cloud-based automated assistant components 610 leverage the virtually limitless resources of the cloud to perform more robust and/or more accurate processing of audio data, and/or other user interface input, relative to any counterparts of the local engine(s) 606. Again, in various implementations, the client device 602 can provide audio data and/or other data to the cloud-based automated assistant components 610 in response to the invocation engine detecting a spoken invocation phrase, or detecting some other explicit invocation of the automated assistant 600.

The illustrated cloud-based automated assistant components 610 include a cloud-based TTS module 612, a cloud-based STT module 614, and a natural language processor 616. TTS engines in accordance with various implementations as described herein can be utilized as TTS module 612. In some implementations, one or more of the engines and/or modules of automated assistant 600 may be omitted, combined, and/or implemented in a component that is separate from automated assistant 600. Further, in some implementations automated assistant 600 can include additional and/or alternative engines and/or modules.

Cloud-based STT module 614 can convert audio data into text, which may then be provided to natural language processor 616. Cloud-based TTS module 614 can convert textual data (e.g., natural language responses formulated by automated assistant 600) into computer-generated speech output. In some implementations, TTS module 612 may provide the computer-generated speech output to client device 602 to be output directly, e.g., using one or more speakers. In other implementations, textual data (e.g., natural language responses) generated by automated assistant 600 may be provided to one of the local engine(s) 606, which may then convert the textual data into computer-generated speech that is output locally.

Natural language processor 616 of automated assistant 600 processes free form natural language input and generates, based on the natural language input, annotated output for use by one or more other components of the automated assistant 600. For example, the natural language processor 616 can process natural language free-form input that is textual input that is a conversion, by STT module 614, of audio data provided by a user via client device 602. The generated annotated output may include one or more annotations of the natural language input and optionally one or more (e.g., all) of the terms of the natural language input.

In some implementations, the natural language processor 616 is configured to identify and annotate various types of grammatical information in natural language input. In some implementations, the natural language processor 616 may additionally and/or alternatively include an entity tagger (not depicted) configured to annotate entity references in one or more segments such as references to people (including, for instance, literary characters, celebrities, public figures, etc.), organizations, locations (real and imaginary), and so forth.

In some implementations, the natural language processor 616 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 616 may rely on annotations from one or more other components of the natural language processor 616. In some implementations, in processing a particular natural language input, one or more components of the natural language processor 616 may use related prior input and/or other related data outside of the particular natural language input to determine one or more annotations.

Figure 7:
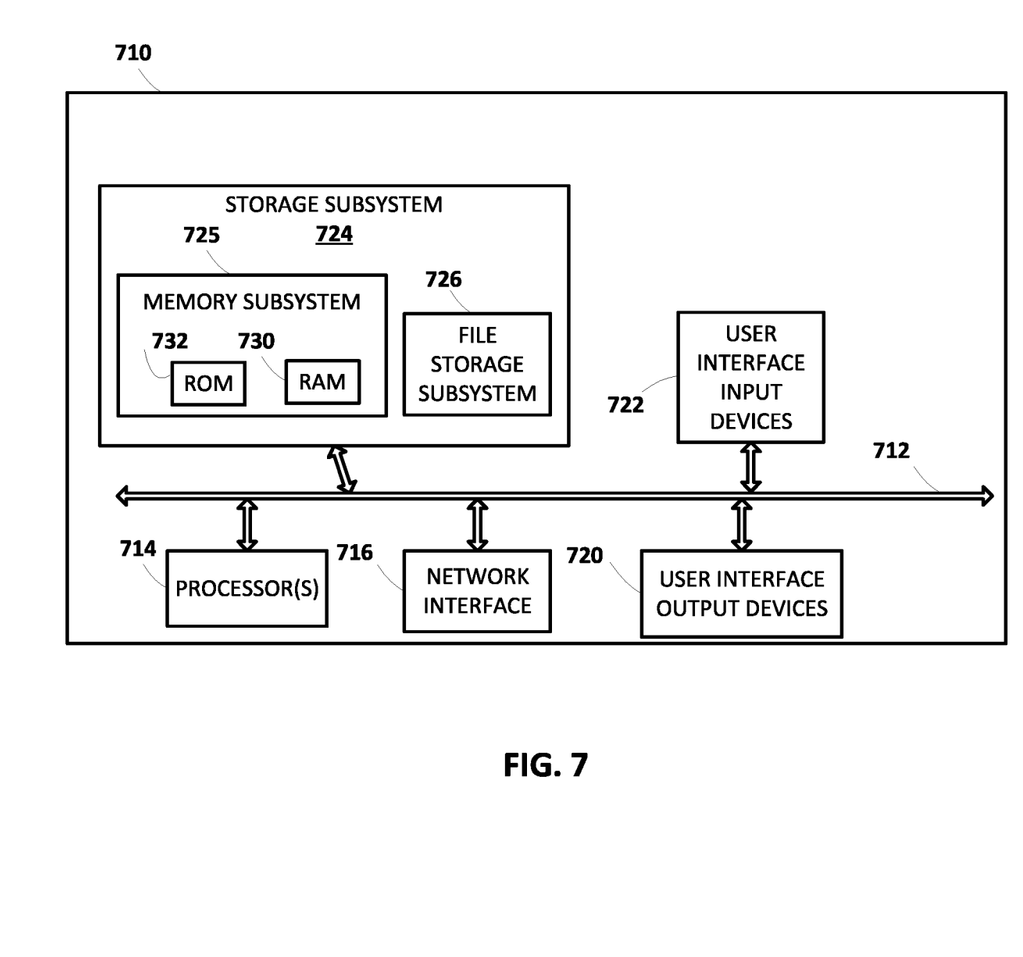
FIG. 7 illustrates an example architecture of a computing device.

FIG. 7 is a block diagram of an example computing device 710 that may optionally be utilized to perform one or more aspects of techniques described herein. In some implementations, one or more of a client computing device, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of one or more of the processes of FIGS. 3-5, as well as to implement various components depicted in FIG. 1.

These software modules are generally executed by processor 714 alone or in combination with other processors. Memory 725 used in the storage subsystem 724 can include a number of memories including a main random access memory ("RAM") 730 for storage of instructions and data during program execution and a read only memory ("ROM") 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for generating computer generated speech from a natural language textual data stream, the method implemented by one or more processors and comprising:

receiving a natural language textual data stream to be converted into computer generated speech for rendering to a user via one or more speakers of a computing device, wherein the natural language textual data stream includes a primary portion that is in a primary language assigned to the user, and a secondary portion that is not in the primary language assigned to the user;

determining whether the secondary portion of the natural language textual data stream is in a secondary language that is not assigned as a familiar language for the user;

processing the primary portion of the natural language textual data stream to determine a first set of phonemes that are assigned to the primary language and that correspond to the primary portion;

processing the secondary portion of the natural language textual data stream to determine a second set of phonemes, in a universal phoneme set, that corresponds to the secondary portion, wherein the universal phoneme set includes at least phonemes common to a plurality of languages, including the secondary language and an additional secondary language;

in response to determining that the secondary portion is in the secondary language that is not assigned as a familiar language for the user:

mapping one or more second phonemes in the determined second set of phonemes, that are in the universal phoneme set and that correspond to the secondary portion and that are not for the primary language, to one or more correlated phonemes in the primary language, wherein the one or more correlated phonemes differ from the one or more second phonemes, and wherein mapping the one or more second phonemes to the one or more correlated phonemes is based on defined mappings that are between phonemes in the universal phoneme set to primary language phonemes;

generating a modified second set of phonemes by replacing the one or more second phonemes, in the determined second set of phonemes, with the correlated phonemes in the primary language;

processing the first set of phonemes and the modified second set of phonemes to generate audio data that mimics a human speaker speaking the first set of phonemes and the modified second set of phonemes; and causing the audio data to be rendered via the one or more speakers of the computing device.

2. The method of claim 1, further comprising:

in response to determining that the secondary portion is not in the secondary language that is not assigned as a familiar language for the user and instead is in the additional secondary language that is assigned as a familiar language for the user:

processing the first set of phonemes and the second set of phonemes without mapping the second set of phonemes to phonemes in the primary language; and causing alternate audio data to be rendered via the one or more speakers of the computing device.

3. The method of claim 2, wherein the additional secondary language is assigned as a familiar language for the user based on data provided by the computing device or based on data stored in association with an account assigned to the user.

4. The method of claim 2, wherein processing the first set of phonemes and the second set of phonemes to generate the alternate audio data comprises processing the first set of phonemes and the second set of phonemes using a trained neural network model trained at least in part based on audio data from a human speaker that is fluent in the primary language and is fluent in the additional secondary language.

5. The method of claim 1, wherein a remote computing system provides the natural language textual data stream and provides, with the natural language textual data stream, an indication that the secondary portion is not in the primary language.

6. The method of claim 1, further comprising:

determining that the secondary portion of the natural language textual data stream is not in the primary language, wherein determining that the secondary portion is not in the primary language comprises:
   determining that one or more secondary words in the natural language textual data stream are not in a primary language lexicon for the primary language.

7. The method of claim 6, wherein processing the secondary portion of the natural language textual data stream to determine the second set of phonemes in the universal phoneme set that correspond to the secondary portion comprises:
   determining that the one or more second words that are not in the primary language lexicon for the primary language, are in an alternate lexicon; and
   retrieving the second set of phonemes for the secondary portion in the alternate lexicon.

8. The method of claim 6, wherein processing the secondary portion of the natural language textual data stream to determine the second set of phonemes in the universal phoneme set that correspond to the secondary portion comprises:
   automatically determining the second set of phonemes using a grapheme to phoneme model.

9. The method of claim 1, wherein processing the first set of phonemes and the modified second set of phonemes to generate audio data that mimics a human speaker speaking the first set of phonemes and the modified second set of phonemes comprises processing the first set of phonemes and the second set of phonemes using a neural network model trained to generate human speech using phonemes that are specific to each of multiple languages.

10. The method of claim 9, wherein the neural network model is trained by:
   training the neural network model based on a plurality of training instances that each includes a corresponding cross-lingual spoken utterance from a multilingual user and corresponding cross-lingual phonemes corresponding to the cross-lingual spoken utterance.

11. The method of claim 1, wherein each phoneme in the universal phoneme set is distinct from all other phonemes in the universal phoneme set.

12. A method for generating computer generated speech from a natural language textual data stream, the method implemented by one or more processors and comprising:
   receiving, at a computing system remote from a client device, a natural language textual data stream to be converted into computer generated speech for rendering to a user via one or more speakers of the client device, wherein the natural language textual data stream includes a primary portion that is in a primary language assigned to the user, and a secondary portion that is not in the primary language assigned to the user;
   determining whether the secondary portion of the natural language textual data stream is in a secondary language that is not assigned as a familiar language for the user;
   processing the primary portion of the natural language textual data stream to determine a first set of phonemes that are assigned to the primary language and that correspond to the primary portion;
   processing the secondary portion of the natural language textual data stream to determine a second set of phonemes in a universal phoneme set that correspond to the secondary portion, wherein the universal phoneme set includes at least phonemes common to a plurality of languages including the secondary language and an additional secondary language;
   in response to determining that the secondary portion is in the secondary language that is not assigned as a familiar language for the user:
      mapping one or more second phonemes in the determined second set of phonemes, that are in the universal phoneme set and that correspond to the secondary portion and that are not for the primary language, to one or more correlated phonemes in the primary language, wherein the one or more correlated phonemes differ from the one or more second phonemes, and wherein mapping the one or more second phonemes to the one or more correlated phonemes is based on defined mappings that are between phonemes in the universal phoneme set to primary language phonemes;
      generating a modified second set of phonemes by replacing the one or more second phonemes, in the determined second set of phonemes, with the correlated phonemes in the primary language;
      processing the first set of phonemes and the modified second set of phonemes to generate audio data that mimics a human speaker speaking the first set of phonemes and the modified second set of phonemes; and
      causing the audio data to be rendered via the one or more speakers of the client device.

13. The method of claim 12, wherein the natural language textual data stream is generated by the computing system remote from the client device.

14. The method of claim 13, wherein the natural language textual data stream is transmitted by the remote client device to the computing system via a network.

15. A system comprising one or more processors and memory operably coupled with the one or more processors, wherein the memory stores instructions that, in response to execution of the instructions by one or more processors, cause the one or more processors to perform:
   receiving a natural language textual data stream to be converted into computer generated speech for rendering to a user via one or more speakers of a computing device, wherein the natural language textual data stream includes a primary portion that is in a primary language assigned to the user, and a secondary portion that is not in the primary language assigned to the user;
   determining whether the secondary portion of the natural language textual data stream is in a secondary language that is not assigned as a familiar language for the user;
   processing the primary portion of the natural language textual data stream to determine a first set of phonemes that are assigned to the primary language and that correspond to the primary portion;
   processing the secondary portion of the natural language textual data stream to determine a second set of phonemes, in a universal phoneme set, that corresponds to the secondary portion, wherein the universal phoneme set includes at least phonemes common to a plurality of languages, including the secondary language and an additional secondary language;
   in response to determining that the secondary portion is in the secondary language that is not assigned as a familiar language for the user:
      mapping one or more second phonemes in the determined second set of phonemes, that are in the universal phoneme set and that correspond to the secondary portion and that are not for the primary language, to one or more correlated phonemes in the primary language, wherein the one or more correlated phonemes differ from the one or more second phonemes, and wherein mapping the one or more second phonemes to the one or more correlated phonemes is based on defined mappings that are between phonemes in the universal phoneme set to primary language phonemes;

generating a modified second set of phonemes by replacing the one or more second phonemes, in the determined second set of phonemes, with the correlated phonemes in the primary language;

processing the first set of phonemes and the modified second set of phonemes to generate audio data that mimics a human speaker speaking the first set of phonemes and the modified second set of phonemes; and causing the audio data to be rendered via the one or more speakers of the computing device.

16. The system of claim 15, wherein execution of the instructions further cause the one or more processors to perform:

in response to determining that the secondary portion is not in the secondary language that is not assigned as a familiar language for the user and instead is in the additional secondary language that is assigned as a familiar language for the user:

processing the first set of phonemes and the second set of phonemes without mapping the second set of phonemes to phonemes in the primary language; and causing alternate audio data to be rendered via the one or more speakers of the computing device.

* * * * *